Sept. 6, 1966  P. A. WHISLER  3,270,579
TRANSMISSION

Filed Feb. 6, 1964  3 Sheets-Sheet 1

Inventor
Paul A. Whisler
By W. Murdock
Attorney

Sept. 6, 1966 P. A. WHISLER 3,270,579
TRANSMISSION
Filed Feb. 6, 1964 3 Sheets-Sheet 2
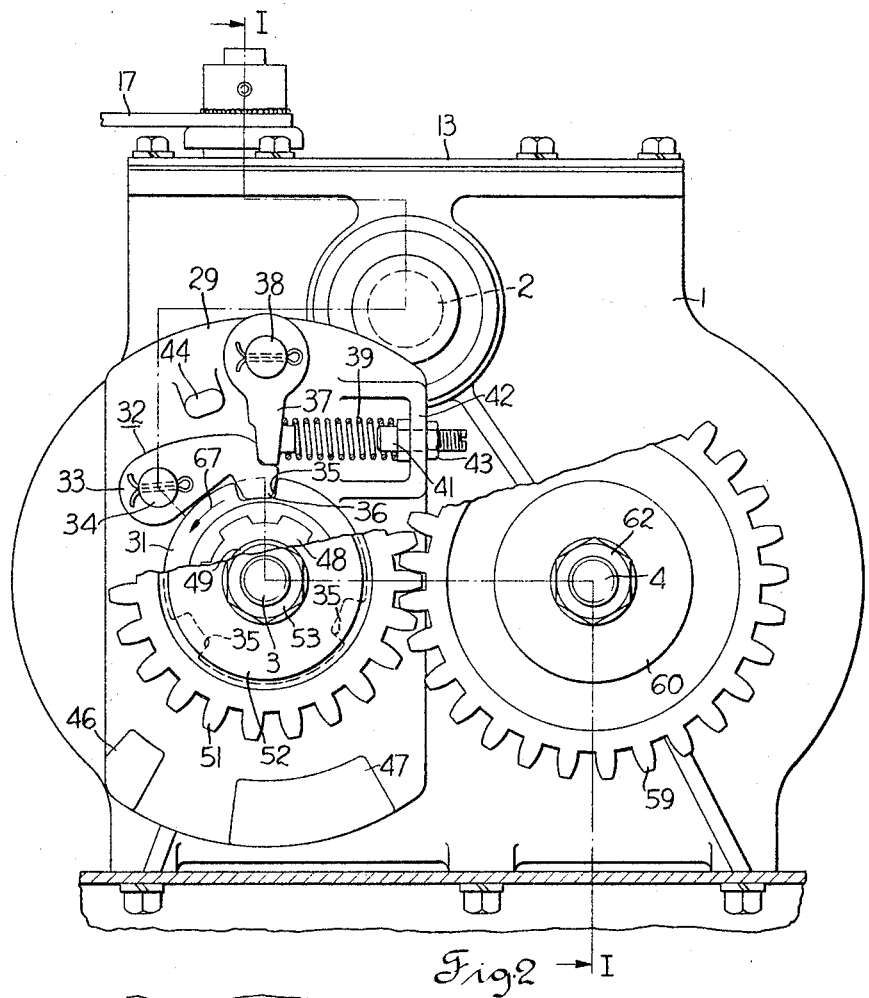
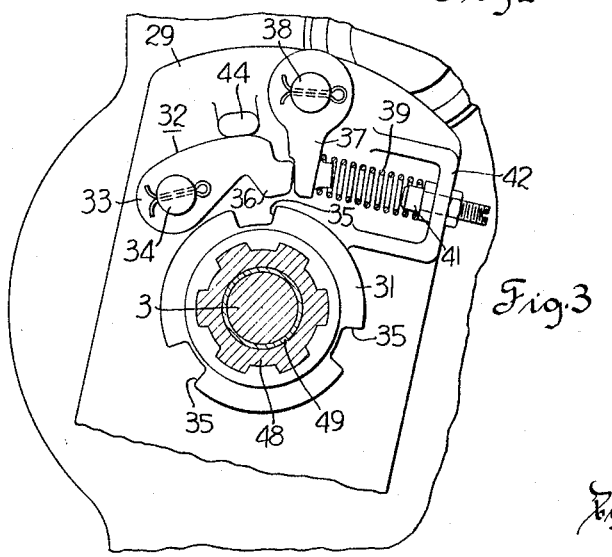
Inventor
Paul A. Whisler
By W. Pierold
Attorney Sept. 6, 1966  P. A. WHISLER  3,270,579
TRANSMISSION Filed Feb. 6, 1964  3 Sheets-Sheet 3

Inventor
Paul A. Whisler
By W. Ziemba
Attorney

United States Patent Office 3,270,579
Patented Sept. 6, 1966

3,270,579
TRANSMISSION
Paul A. Whisler, La Porte, Ind., assignor to Allis Chalmers Manufacturing Company, Milwaukee, Wis.
Filed Feb. 6, 1964, Ser. No. 342,888
9 Claims. (Cl. 74—325)

The invention relates to power transmitting mechanisms. More particularly, it is concerned with the transmission of engine power to apparatus, such as a forage harvester, which not only requires control of its input power but also protection against overloads.

The principal object of the invention is to provide a transmission which is selectively operable to establish different driving connections between a rotatable power input shaft and a rotatable power output shaft, which upon establishment of one of said driving connections will automatically interrupt said driving connection under overload, and which will be operable to transmit power from said input to said output shaft through another of said driving connections irrespective of whether or not an overload condition has caused automatic interruption of said one driving connection.

Another object of the invention is to provide a transmission of the above mentioned character wherein the direction of rotation of the output shaft may be reversed after an overload condition has caused interruption of the transmission of driving power to the output shaft.

A further object of the invention is to provide a transmission of the above mentioned character incorporating a pair of readily removable intermeshing gears through which power is transmitted to the output shaft, the purpose being to provide for a change of transmission ratio by substituting one pair of intermeshing gears for another, or by interchanging the gears on their respective shafts.

A further object of the invention is to provide a transmission of the above mentioned character which may readily be serviced when necessary, as for instance when the transmission of driving power to the output shaft has been automatically interrupted due to an overload, or when it is desired to change the transmission ratio by interchanging or replacing intermeshing gears.

A still further object of the invention is to provide a transmission of the above mentioned character which is compact, simple, sturdy and reliable, and which may be manufactured at relatively low costs.

These and other objects and advantages are attained by the present invention, various novel features of which will be apparent from the description herein and the accompanying drawings disclosing an embodiment of the invention, and will be more particularly pointed out in the appended claims.

In the drawings:

FIG. 2 is a side view of the transmission shown in FIG. 1, the view of FIG. 2 being taken in the direction of arrow II in FIG. 1;

FIG. 3 is a detail view showing parts of FIG. 2 in a different condition of adjustment;

Figure 1:
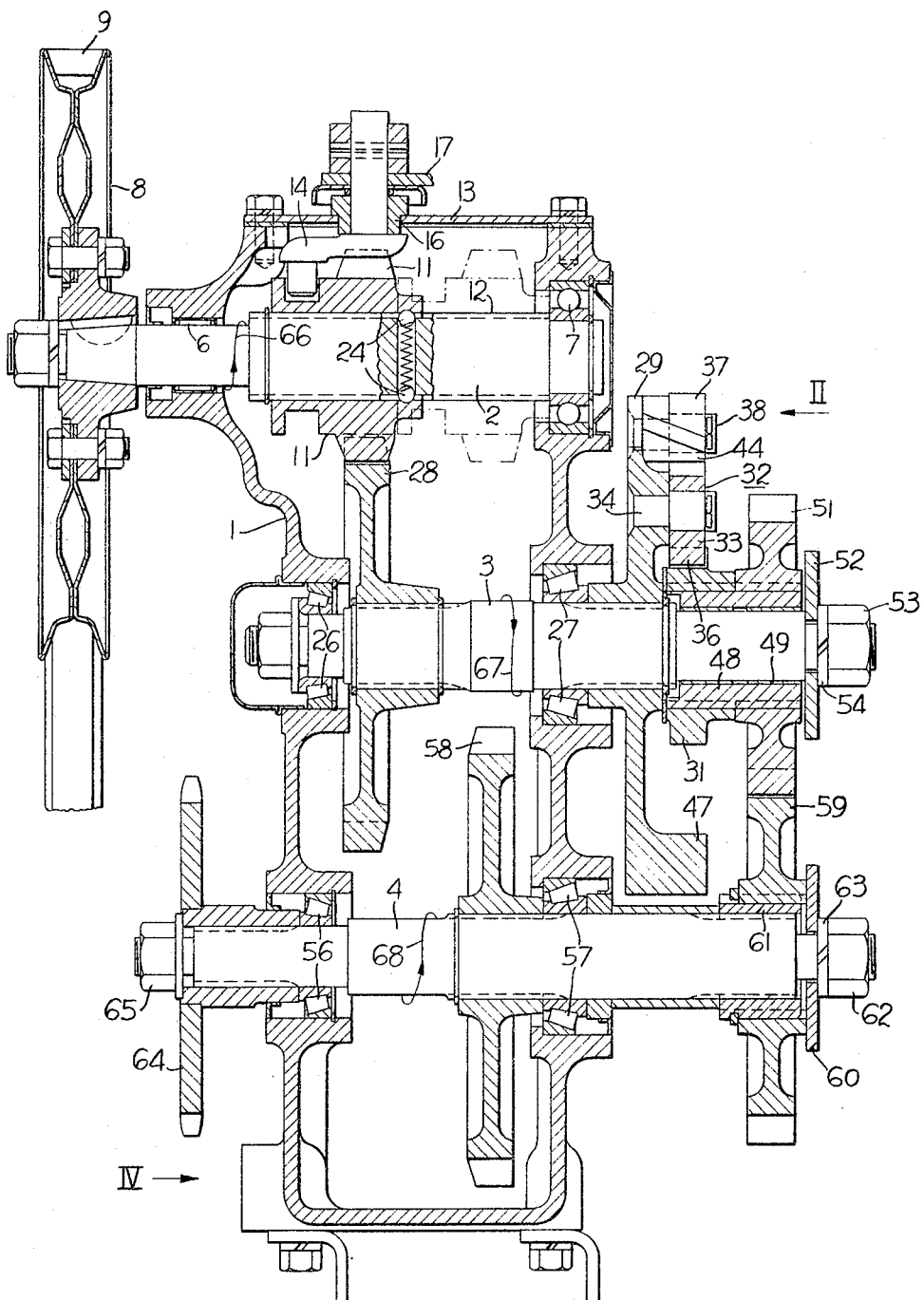
FIG. 1 is a sectional view of a transmission embodying the invention, the view of FIG. 1 being developed along line I—I of FIG. 2.

Referring to FIG. 1, a gear box 1 serves as a support for three parallel, transversely spaced shafts, one, shown at the top of FIG. 1, being a power input shaft designated by the reference character 2; another, shown at the middle of FIG. 1 and at the left of FIG. 2, being a countershaft designated by the reference character 3; and a third, shown at the bottom of FIG. 1 and at the right of FIG. 2, and being a power output shaft designated by the reference character 4.

The input shaft 2 is rotatably mounted in axially fixed position on opposite side walls of the gear box 1 by means of antifriction bearings 6 and 7. A V-belt sheave 8 is keyed to the input shaft 2 outside of the gear box 1, and a V-belt 9 is trained about the sheave 8 for driving the shaft 2 from a suitable source of power, not shown. Inside of the gear box 1 the shaft 2 mounts a pinion 11 which has internal splines in axially shiftable engagement with external splines 12 of the shaft 2.

Figure 5:
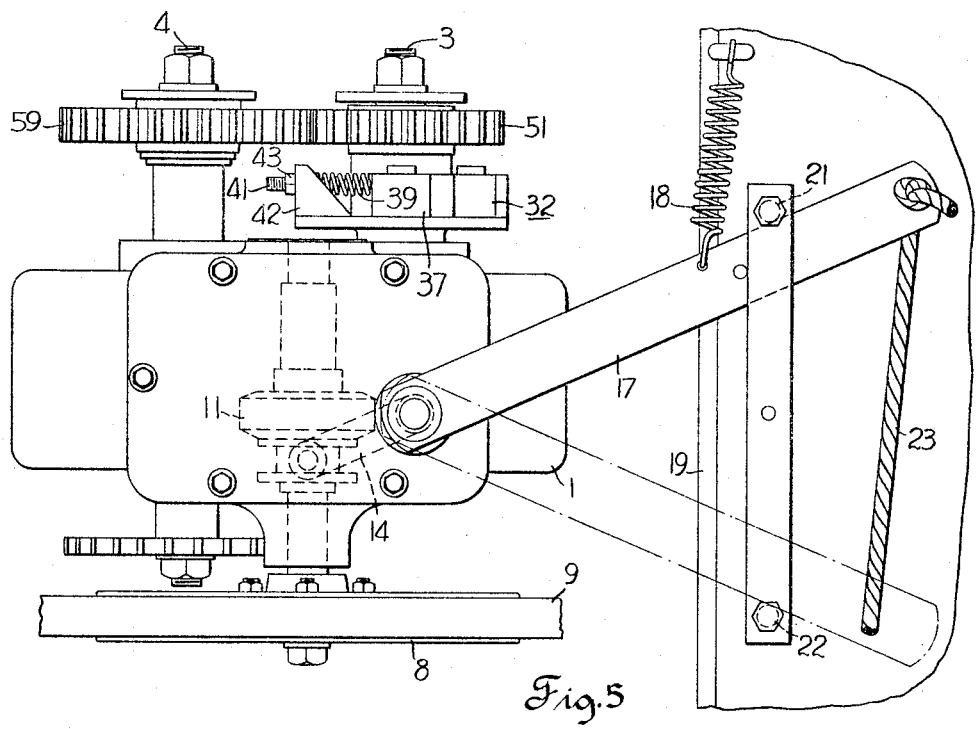
FIG. 5 is a top view of the transmission shown in FIG. 4.
Figure 4:
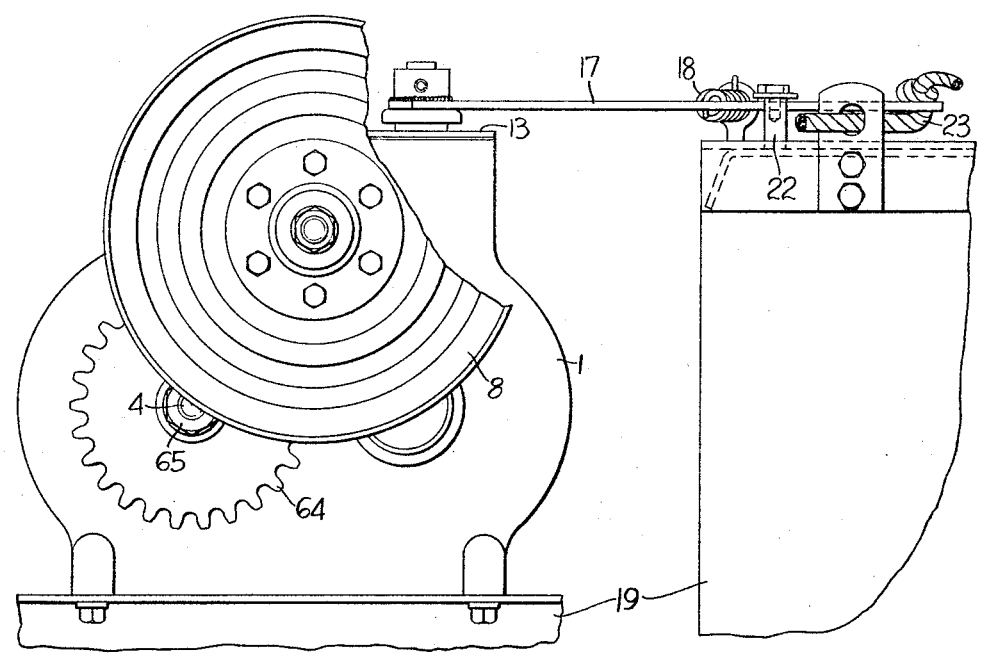
FIG. 4 is another side view of the transmission shown in FIG. 1, the view of FIG. 4 being taken in the direction of arrow IV in FIG. 1.

A control mechanism for shifting the pinion 11 from a first position, in which it is shown in full lines in FIG. 1, to a second position in which it is shown in dotted lines, is mounted on a cover 13 of the gear box 1. The control mechanism comprises a crank 14 which is journaled in a bearing 16 of the cover 13 in offset relation to the shaft 2, as best shown in FIGS. 2 and 5. An actuating lever 17 is secured to the pivot shaft of the crank 14 above the cover 13, and a stud at the distal end of the crank engages a circumferential groove of the pinion 11. As shown in FIG. 5, a coil spring 18 is hooked into the lever 17 at a radial distance from its pivot axis, and the other end of the spring 18 is anchored on a frame structure 19 which supports the gear box 1. Stops 21 and 22 on the frame structure 19 limit the range of swinging movement of the lever 17, and the spring 18 normally draws the lever 17 into the full line position in which it is shown in FIG. 4 and in which it bears against the stop 21. A rope 23 is attached to the free end of the lever 17 for actuation of the latter from a remote point.

When the lever 17 is swung from the full line position to the dotted line position indicated in FIG. 4, the pinion 11 moves from the full line position to the dotted line position indicated in FIG. 1. A ball detent 24 releasably retains the pinion 11 in its full line position and yields to axial thrust which may be exerted upon the pinion 11 by pull on the rope 23. Constant pull on the rope to keep the lever 17 against the stop 22, keeps the pinion 11 in its dotted line positon. When the pull is relaxed and the rope slackens, the pinion returns from its dotted line to its full line position under the tension of spring 18.

The countershaft 3 is rotatably mounted in axially fixed position on opposite side walls of the gear box 1 by means of conical roller bearings 26 and 27. Inside of the gear box 1 the countershaft 3 mounts a first countergear 28 which is axially secured to the countershaft for rotation therewith, and which is adapted to mesh with the driving pinion 11 upon shifting of the latter into the first axially adjusted position in which it is shown in full lines in FIG. 1.

Outside of the gear box 1 the countershaft 3 mounts an overload release mechanism which comprises a driving clutch element 29 secured to the countershaft for rotation therewith; a driven clutch element 31 rotatably mounted on the countershaft coaxially with the driving clutch element 29; and torque responsive coupling means, generally designated in FIG. 1 by the reference character 32, releasably connecting the driving and driven clutch elements 29, 31 for rotation in unison with each other. Referring to FIG. 2, the torque responsive coupling means 32 of the overload release mechanism comprises a clutch dog 33 pivoted at 34 on the driving clutch element 29 and extending circumferentially along a circular flange of the driven clutch element 31. The flange of the driven clutch element 31 has three notches 35 equally spaced circumferentially of the element 31, and the dog 33 has a tooth 36 adapted to enter any one of the notches 35. A latch 37 for releasably retaining the dog 33 in cooperative engagement with the driven clutch element 31 is pivoted at 38 on the driving clutch element 29. The latch 37 has a free end portion which, as shown in FIG. 2, may be seated in a recess of the dog 33, and which may be unseated from the recess as illustrated by FIG. 3. A compression spring 39 biases the latch 37 into engagement with the dog 33, one end of the spring being mounted on a stud 41 and the other end of the spring bearing against the latch 37. The stud 41 is screw threaded into a flange portion 42 of the driving clutch element 29, and it is secured in adjusted position by a lock nut 43. A slot is milled into the free end of the stud 41 to provide for turning of the stud by means of a screw driver when it is desired to adjust the pressure which is exerted by the spring 39 upon the latch 37 and through the latter upon the dog 33.

The notches 35 of the driven clutch element 31 are suitably tapered, and the tooth 36 of the dog 33 has a suitable complementary taper so that transmission of torque from the driving clutch element 29 to the driven clutch element 31 through the clutch dog 33 will set up a force component which tends to swing the dog outwardly about its pivot at 34 away from the driven clutch element 31. The relatively engageable surface portions of the dog recess and of the latch 37 are suitably shaped so that a force component tending to swing the latch 37 about its pivot at 38 away from the dog 33 will become effective upon the latch 37 when the dog 33 tends to swing about its pivot at 34 away from the driven clutch element 31. Such swinging tendency of the latch 37 is opposed by the spring 39, and depending upon the pressure which is exerted by the spring 39 upon the latch 37, a greater or lesser amount of torque may be transmitted from the driving clutch element 29 to the driven clutch element 31 before the spring 39 yields sufficiently to let the dog 33 move on the driving clutch element 29 from the locking position in which it is shown in FIG. 2 to the unlocking position in which it is shown in FIG. 3.

Outward swinging movement of the dog 33 about its pivot at 34 is limited by a stop lug 44 on the driving clutch element, and return movement of the dog 33 from its unlocking to its locking position is frictionally restrained by contact of the latch 37 with the free end of the dog 33 under the pressure of the spring 39. The driving clutch element 29 is balanced by counterweights 46 and 47 in diametrically opposed relation to the dog 33 and associated parts.

The driven clutch element 31 is spline mounted on a sleeve 48 which in turn is rotatably supported on the countershaft 3 by means of a bushing 49. Also spline mounted on the sleeve 48 is an output gear 51; and a washer 52 is retained on the shaft 3 at the axially outer side of the gear 51 by means of a nut 53 and lock washer 54.

The output shaft 4 is rotatably mounted in axially fixed position on opposite side walls of the gear box 1 by means of conical roller bearings 56 and 57. Secured to the output shaft 4 within the gear box 1 is a second countergear 58 to which power may be transmitted directly from the input shaft 2 by shifting the pinion 11 from the full line position in which it is shown in FIG. 1 to the dotted line position. The gear 58 is suitably secured against axial displacement within the gear box 1, and its teeth and the teeth of pinion 11 are designed so that meshing engagement of the pinion 11 with the gear 28 may readily be established and interrupted by back and forth adjustment of the pinion 11 on the input shaft 2.

Also mounted on the output shaft 4 for rotation in unison therewith, but outside of the gear box 1, is an output gear 59 which meshes with the output gear 51 on the countershaft 3. The output gear 59 is splined on a sleeve 61 which in turn is splined on the shaft 4, and a washer 60 is drawn up against the hub of the gear 59 by means of a nut 62 on the shaft 4 and lock washer 63.

A sprocket wheel 64 is splined on the outer end of the shaft 4 and retained by a nut 65 at the side of the gear box remote from the output gear 59, the sprocket wheel 64 providing for connection of the transmission with driven mechanism, not shown.

In the condition of the transmission as shown in FIGS. 1 and 2, in which the pinion 11 meshes with the countergear 28, and in which the driving and driven clutch elements 29 and 31 are releasably coupled for rotation in unison with each other, rotation of the power input shaft 2 in the direction of arrow 66 will cause rotation of the countershaft 3 in the direction of arrow 67, also shown in FIG. 2; and rotation of the output shaft 4 in the direction of arrow 68 which is the same direction as the direction of rotation of the input shaft 2.

While the shafts 2, 3 and 4 are rotating in the indicated directions, an overload condition may arise, for instance if a driven mechanism, not shown, which is connected to the sprocket wheel 64 should develop undue resistance against turning under an abnormal working condition. For example, if the transmission is installed on a forage harvester and the sprocket wheel 64 is connected in driving relation with a pair of oppositely rotating feed rollers of the machine, a stone entering between the feed rollers could cause such an abnormal working condition. The overload release mechanism comprising the driving and driven clutch elements 29, 31 and the clutch dog 33 limits the torque which may be transmitted from the countershaft 3 to the output shaft 4. If, due to an overload condition, the torque on shaft 3 should exceed the limit torque of the overload release mechanism which is determined by the pressure of the spring 39, the dog 33 is cammed out of the normally engaged notch 35 and the overload release mechanism assumes the release condition illustrated by FIG. 3.

Upon release of the overload release mechanism rotation of the shafts 2 and 3 in the direction of arrows 66 and 67 may continue but the output shaft 4 will no longer be subjected to driving torque. To restore the transmission of driving power to the output shaft, the dog 33 may be driven, as by a hammer blow, from the position in which it is shown in FIG. 3 to the position in which it is shown in FIG. 2.

The provision of the auxiliary gearing, including the second countergear 58, permits convenient reversal of the direction of rotation of the power output shaft 4. Such reverse operation of the shaft makes it convenient to operate the driven mechanism, not shown, in reverse after its normal operation has been stopped by the overload release mechanism. In order to reverse the drive of the output shaft 4, an operator merely has to pull on the rope 23 and hold it tight as long as it is desired to operate the shaft 4 in reverse. During reverse rotation of the shaft 4, gear 51 and driven clutch element 31 idle on countershaft 3, provided that the clutch dog 33 is kept out of locking engagement with the driven clutch element 31 as shown in FIG. 3. On the other hand, if the overload release mechanism is in engaged condition as illustrated by FIG. 2, while the pinion 11 is kept in mesh with the countergear 58 and rotated in the direction of arrow 66, the countershaft 3 together with the gear 28 will be driven in the direction opposite to that of arrow 67.

In order to change the transmission ratio between the shafts 3 and 4, the output gears 51 and 59 may be replaced by another set of intermeshing gears, not shown, affording a different ratio of pitch diameters; or the gears 51, 59 may be interchanged by placing the gear 52 which has the smaller pitch diameter (FIG. 2) upon the shaft 4, and the gear 59 which has the larger pitch diameter upon the shaft 3.

It will be noted that restoration of the overload release mechanism after it has been disengaged by an overload condition, as well as an interchange or replacement of the output gears 51, 59 may readily be effected without opening the gear box 1.

While in the foregoing a preferred embodiment of the invention has been disclosed, it should be understood that it is not intended to limit the invention to that embodiment but that the invention includes such other forms and modifications as are embraced by the scope of the appended claims.

The embodiments of the invention in which an exclusive property or privilege is claimed are defined as follows:

1. In a transmission, the combination of relatively rotatable power input and output shafts, a selectively engageable and disengageable gear train and a torque limiting device operatively interposed between said shafts; and auxiliary gearing independent of said torque limiting device operable to establish and interrupt a driving connection between said shafts upon disengagement of said gear train.

2. A transmission as set forth in claim 1, wherein said gear train and auxiliary gearing are constructed and arranged so as to drive said output shaft from said input shaft through said gear train in one direction and through said auxiliary gearing in the other direction.

3. A transmission as set forth in claim 1, wherein said gear train and auxiliary gearing are constructed and arranged so that said output shaft will be driven in the direction of rotation of said input shaft by said gear train and in the opposite direction by said auxiliary gearing.

4. In a transmission, the combination of relatively rotatable power input and output shafts; an overload release mechanism comprising relatively rotatable driving and driven elements and torque responsive coupling means releasably connecting said driving and driven elements for rotation in unison with each other; selectively engageable and disengageable power transmitting means operatively interposed between said input shaft and said driving element of said overload release mechanism; power transmitting means operatively connecting said driven element of said overload release mechanism with said output shaft; and selectively engageable and disengageable power transmitting means operable to connect said output shaft in driven relation with said input shaft independently of said overload release mechanism.

5. In a transmission, the combination of relatively rotatable power input and output shafts; an overload release mechanism comprising driving and driven elements relatively rotatable on a common axis extending parallel to said input shaft in transversely spaced relation thereto, and torque responsive coupling means releasably connecting said driving and driven elements for rotation in unison with each other; a selectively engageable and disengageable gear train comprising a driving gear on said input shaft and a driven gear coaxially connected with said driving element of said overload release mechanism and adapted to mesh with said driving gear; power transmitting means operatively connecting said driven element of said overload release mechanism with said output shaft; and selectively engageable and disengageable power transmitting means operable to connect said output shaft in driven relation with said input shaft independently of said overload release mechanism.

6. In a transmission, the combination of relatively rotatable power input and output shafts; an overload release mechanism comprising driving and driven elements relatively rotatable on a common axis extending parallel to said output shaft in transversely spaced relation thereto, and torque responsive coupling means releasably connecting said driving and driven elements for rotation in unison with each other; selectively engageable and disengageable power transmitting means operatively interposed between said input shaft and said driving element of said overload release mechanism; a pair of intermeshing gears, one detachably connected in torque transmitting relation to said driven element of said overload release mechanism, and the other detachably connected in torque transmitting relation to said power output shaft; and selectively engageable and disengageable power transmitting means operable to connect said output shaft in driven relation with said input shaft independently of said overload release mechanism.

7. A transmission comprising a support; a power input shaft, a countershaft and a power output shaft rotatably mounted on said support in transversely spaced parallel relation to each other; a driving pinion splined on said input shaft for selective adjustment axially thereof to first and second positions; a first countergear axially secured to said countershaft for rotation therewith and adapted to mesh with said pinion upon shifting of the latter into said first position; an overload release mechanism comprising a driving element secured to said countershaft for rotation therewith, a driven element rotatably mounted on said countershaft coaxially with said driving element, and torque responsive coupling means releasably connecting said driving and driven elements for rotation in unison with each other; a pair of intermeshing output gears, one mounted on said countershaft for rotation relative thereto in unison with said driven element of said overload release mechanism, and the other mounted on said output shaft for rotation in unison therewith; and a second countergear secured to said output shaft and adapted to mesh with said driving pinion upon shifting of the latter to said second position.

8. A transmission as set forth in claim 7, comprising a gear box affording said support and containing said driving pinion and said first and second countergears; said overload release mechanism and intermeshing output gears being mounted outside of said gear box.

9. A transmission as set forth in claim 8, wherein said intermeshing output gears are releasably connected in axially withdrawable relation with said driven element of said overload release mechanism and with said output shaft, respectively.

References Cited by the Examiner
UNITED STATES PATENTS 2,162,786 10/1952 Schmitter _____ 74—325
2,824,637 2/1958 Unk et al. _____ 192—56

OTHER REFERENCES

Beaty et al.: "Overload Clutch," IBM Technical Disclosure Bulletin, vol. 4, No. 12, May 1962, p. 5.

DAVID J. WILLIAMOWSKY, *Primary Examiner.*

H. S. LAYTON, *Examiner.*